United States Patent
Hartman et al.

(10) Patent No.: US 10,832,394 B2
(45) Date of Patent: Nov. 10, 2020

(54) BUILD MATERIAL LAYER QUALITY LEVEL DETERMINATION

(71) Applicant: Hewlett-Packard Development Company, L.P., Houston, TX (US)

(72) Inventors: Aja Hartman, Palo Alto, CA (US); Lihua Zhao, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/098,061

(22) PCT Filed: Jul. 29, 2016

(86) PCT No.: PCT/US2016/044755
§ 371 (c)(1),
(2) Date: Oct. 31, 2018

(87) PCT Pub. No.: WO2018/022093
PCT Pub. Date: Feb. 1, 2018

(65) Prior Publication Data
US 2019/0147585 A1 May 16, 2019

(51) Int. Cl.
*B33Y 30/00* (2015.01)
*B33Y 50/02* (2015.01)
(Continued)

(52) U.S. Cl.
CPC .......... *G06T 7/0004* (2013.01); *B29C 64/393* (2017.08); *B33Y 30/00* (2014.12);
(Continued)

(58) Field of Classification Search
CPC ..... B29C 64/165; B29C 64/30; B29C 64/393; B33Y 10/00; B33Y 30/00; B33Y 40/00;
(Continued)

(56) References Cited

U.S. PATENT DOCUMENTS 4,344,683 A * 8/1982 Stemme ............... G03B 17/245
355/40
5,031,120 A * 7/1991 Pomerantz ............ B29C 64/135
700/120
(Continued)

FOREIGN PATENT DOCUMENTS

CN 102186653 9/2011
CN 105358310 2/2016
(Continued)

OTHER PUBLICATIONS

Bridget Butler Millaps, "Make Your Marketing Tangible with 3D Printed QR Codes", 3D Design, 3D Printing, Dec. 23, 2014, 7 pages. < https://3dprint.com/33028/3d-printed-qr-codes/ >.
(Continued)

*Primary Examiner* — Yubin Hung
(74) *Attorney, Agent, or Firm* — Mannava & Kang

(57) ABSTRACT

According to an example, an apparatus may include an image capture device, a controller, and a computer readable storage medium. The computer readable storage medium may include instructions that may cause the controller to receive, from the image capture device, an image of a testing agent deposited in a testing pattern onto a layer of build materials, in which the layer of build materials is to form a section of a three-dimensional printed part. The instructions may also cause the controller to determine a condition of the deposited testing pattern in the received image, wherein the determined condition is to be used to determine a quality level of the layer of build materials based upon the determined condition.

13 Claims, 6 Drawing Sheets

(51) Int. Cl.
  *B33Y 99/00* (2015.01)
  *G01N 21/88* (2006.01)
  *G06T 7/00* (2017.01)
  *G01N 21/95* (2006.01)
  *B29C 64/393* (2017.01)
  *B29C 64/30* (2017.01)
  *G01N 21/64* (2006.01)
  *B29C 64/165* (2017.01)

(52) U.S. Cl.
  CPC ............... *B33Y 50/02* (2014.12); *B33Y 99/00* (2014.12); *G01N 21/8851* (2013.01); *G01N 21/9515* (2013.01); *B29C 64/165* (2017.08); *B29C 64/30* (2017.08); *G01N 21/64* (2013.01); *G01N 2021/6439* (2013.01); *G06T 2207/30144* (2013.01)

(58) Field of Classification Search
  CPC .... B33Y 50/02; B33Y 99/00; G01N 2021/64; G01N 2021/6439; G01N 2021/8851; G01N 2021/9515; G06T 7/0004; G06T 2207/30144
  See application file for complete search history.

(56) References Cited

U.S. PATENT DOCUMENTS

| | | | |
|---|---|---|---|
| 9,076,097 | B1 | 7/2015 | Cudak et al. |
| 9,248,611 | B2 | 2/2016 | Divine et al. |
| 2002/0079601 | A1 | 6/2002 | Zengerle et al. |
| 2006/0111807 | A1* | 5/2006 | Gothait ............... B29C 64/386 700/119 |
| 2014/0037857 | A1 | 2/2014 | Cheverton et al. |
| 2014/0114630 | A1* | 4/2014 | Brave .................... G06F 30/20 703/6 |
| 2014/0167300 | A1* | 6/2014 | Lee ................... A61C 13/0013 264/17 |
| 2014/0263674 | A1 | 9/2014 | Cerveny |
| 2015/0105891 | A1* | 4/2015 | Golway ................ G06F 30/20 700/98 |
| 2015/0235069 | A1 | 8/2015 | Kumar et al. |
| 2015/0314039 | A1* | 11/2015 | Dean ...................... B33Y 50/00 522/18 |
| 2016/0059491 | A1* | 3/2016 | Lee ........................ B33Y 10/00 264/40.1 |
| 2016/0101568 | A1 | 4/2016 | Mizes et al. |
| 2016/0159007 | A1* | 6/2016 | Miller, IV ............. D21F 1/0063 162/348 |
| 2016/0214323 | A1 | 7/2016 | Mantell et al. |
| 2016/0283833 | A1* | 9/2016 | Peek ................... G06K 15/408 |
| 2016/0311162 | A1* | 10/2016 | Liu ....................... B33Y 10/00 |
| 2017/0057170 | A1* | 3/2017 | Gupta .................. B29C 64/386 |
| 2017/0246809 | A1* | 8/2017 | Starr ..................... B29C 64/393 |
| 2018/0345583 | A1* | 12/2018 | Leng .................... G16H 50/50 |

FOREIGN PATENT DOCUMENTS

| | | |
|---|---|---|
| CN | 105500701 | 4/2016 |
| EP | 0250121 A2 | 12/1987 |
| EP | 0322257 A2 | 6/1989 |
| FR | 2466794 | 4/1981 |
| WO | WO-2004106041 | 12/2004 |
| WO | WO-2014039378 A1 | 3/2014 |
| WO | WO-2015112959 A1 | 7/2015 |

OTHER PUBLICATIONS

International Preliminary Report on Patentability dated Jan. 29, 2019, PCT Patent Application No. PCT/US2016/044755, filed Jul. 29, 2016, The International Bureau of WIPO, 5 pages.

International Search Report and Written Opinion dated Jun. 1, 2017, PCT Patent Application No. PCT/US2016/044755, filed Jul. 29, 2016, Federal Institute of Industrial Property ISA/RU, 6 pages.

* cited by examiner

BUILD MATERIAL LAYER QUALITY LEVEL DETERMINATION

BACKGROUND

In three-dimensional (3D) printing, an additive printing process is often used to make three-dimensional solid parts from a digital model. 3D printing is often used in rapid product prototyping, mold generation, mold master generation, and short-run manufacturing. Some 3D printing techniques are considered additive processes because they involve the application of successive layers of material to an existing surface (template or previous layer). This is unlike traditional machining processes, which often rely upon the removal of material to create the final part. 3D printing often requires curing or fusing of the building material, which for some materials may be accomplished using heat-assisted extrusion, melting, or sintering, and for other materials may be accomplished using digital light projection technology.

BRIEF DESCRIPTION OF THE DRAWINGS

Features of the present disclosure are illustrated by way of example and not limited in the following figure(s), in which like numerals indicate like elements, in which:

FIG. 1C shows a simplified block diagram of a few components of the example 3D printer depicted in FIG. 1B;

DETAILED DESCRIPTION

Figure 1A:
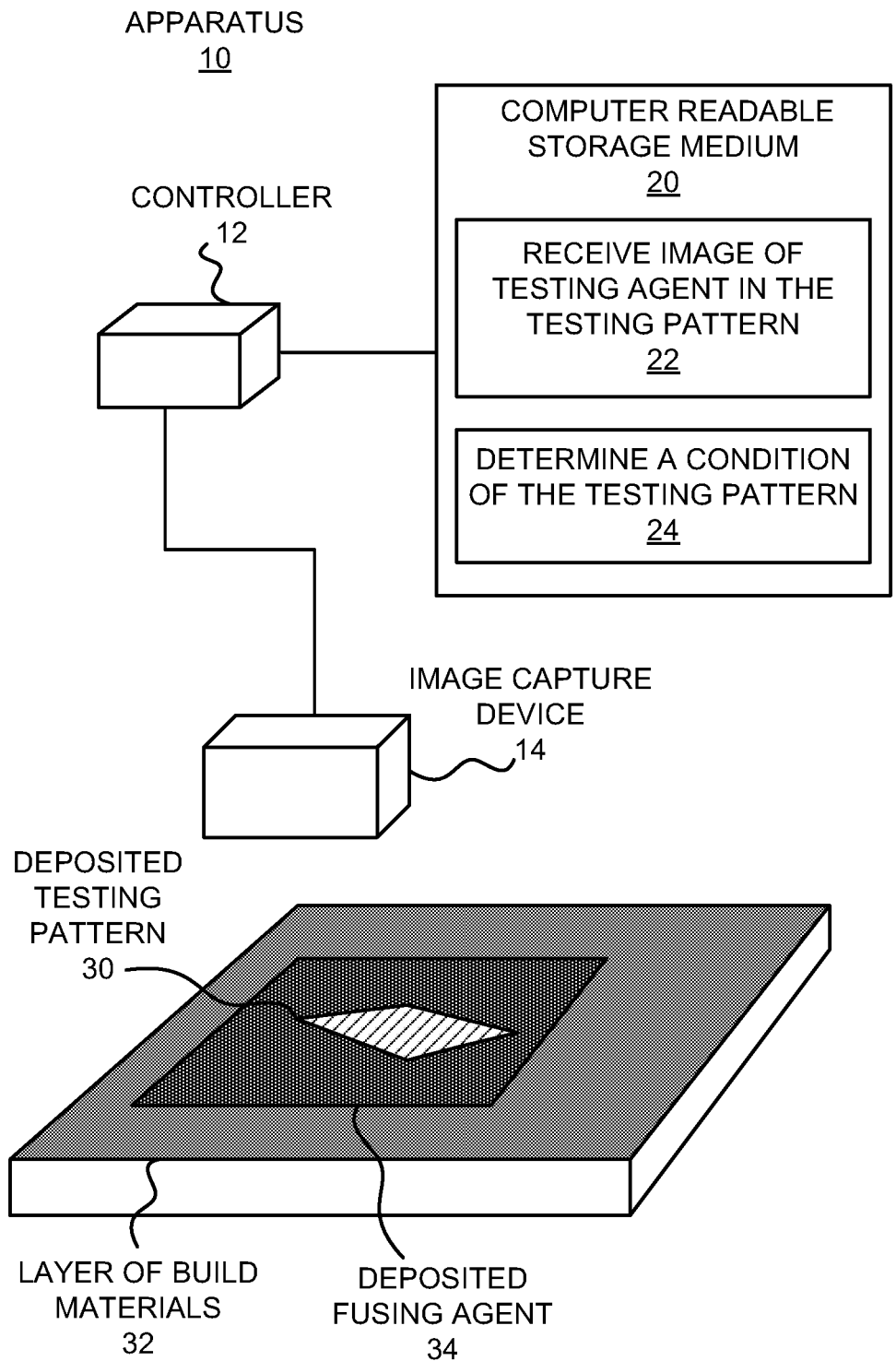
FIG. 1A shows a simplified diagram of an example apparatus for determining a quality level of a layer of build material.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

There may be some variability in many 3D additive printing processes, which may result in variability of the parts being printed. The variability may be caused by either or both the printing hardware and the printing process, which may worsen over time. Thus, for instance, printed parts may have different material properties and quality levels as a result of this variation. Testing may be performed on the printed parts to determine the material properties and the quality levels of the printed parts. The testing may be performed through implementation of mechanical equipment such as tensile testers, hardness testers, or the like. These types of mechanical equipment typically damage or destroy the printed parts during testing, are often expensive, and often require experts to execute tests and process results. Another manner in which the printed parts may be tested is through the use of a forward looking infrared radiometer (FLIR) camera. FLIR cameras may be utilized to sense heat distribution of a print bed, which may be used to determine whether a printed part may have defects. However, FLIR cameras are typically expensive, require specialized software to be implemented properly, and the sensed heat distribution may not provide sufficient quality level information. That is, there may be defects that may not be detected from the sensed heat distribution.

Disclosed herein are apparatuses for determining a quality level of a layer of build materials, 3D printers on which the apparatuses may be implemented, and methods for implementing the apparatuses. The apparatuses disclosed herein may include a controller and an image capture device. The controller may receive, from the image capture device, a captured image of a testing pattern deposited onto a layer of build materials and the controller may determine a condition of the testing pattern from the captured image. The condition of the testing pattern may be used to determine a quality level of the layer of build materials.

The 3D printers disclosed herein may include a testing agent delivery device that may be implemented to deposit a testing agent in a testing pattern onto a layer of a 3D part. Particularly, the testing pattern may be deposited to overlay fusing agent on the layer such that, when the radiation is emitted onto the fusing agent and the build materials on which the fusing agent has been deposited, the condition of the deposited testing pattern may track the quality of the fusing among the build materials. That is, for instance, if there is an issue with the fusing process, i.e., the build materials are not properly fused together, there may be defects on the surface of the layer of build materials. These defects may cause other defects in the deposited testing pattern. For instance, gaps, line distortions of various shapes, blurred lines, or other defects may occur in the deposited testing pattern as a result of the defects in the surface of the layer of build materials.

An image of the deposited testing pattern may be analyzed to determine a condition of the deposited testing pattern. The condition may be based upon the image quality and/or the readability of the deposited testing pattern in the captured image. That is, the deposited testing pattern may be determined to have a relatively good condition if the image quality is high and/or the deposited testing pattern is accurately readable. In addition, the quality level of the layer may be determined based upon the determined condition of the deposited testing pattern. Thus, for instance, the layer may be determined to have a relatively high quality level if the deposited testing pattern is in good condition and to have a relatively low quality level if the deposited testing pattern in poor condition. In one regard, the quality level of the 3D part containing the layer may be determined to be equivalent to the determined quality level of the layer.

Through implementation of the apparatuses, 3D printers, and methods disclosed herein, quality levels of 3D printed parts may be determined in an efficient and cost-effective manner that does not damage or destroy the 3D printed parts.

With reference first to FIG. 1A, there is shown a simplified diagram of an example apparatus 10 for determining a quality level of a layer of build materials. It should be understood that the apparatus 10 depicted in FIG. 1A may include additional components and that some of the components described herein may be removed and/or modified without departing from a scope of the apparatus 10 disclosed herein.

As shown, the apparatus 10 may include a controller 12, an image capture device 14 and a computer readable storage medium 20. The controller 12 may be a computing device, a semiconductor-based microprocessor, a central processing unit (CPU), an application specific integrated circuit (ASIC), and/or other hardware device. The image capture device 14 may be a digital still camera, a digital video camera, or the like, and may communicate captured images to the controller 12. Although not shown, the controller 12 may store the received images in a data store or on a local memory.

The computer readable storage medium 20 may include instructions 22 and 24 (which may also be termed computer readable instructions) that the controller 12 may execute. More particularly, the controller 12 may fetch, decode, and execute the instructions 22 to receive, from the image capture device 14, an image of a testing agent deposited in a testing pattern 30 onto a layer of build materials 32. As discussed herein, the layer of build materials 32 may form a section of a 3D printed part. As shown, the testing pattern 30 may be deposited on top of deposited fusing agent 34.

The controller 12 may also fetch, decode, and execute the instructions 24 to determine a condition of the deposited testing pattern 30 in the received image. According to an example, the image of the testing pattern 30 may be captured following application of radiation to fuse the build materials on which the fusing agent 34 has been deposited. As discussed herein, the condition of the deposited testing pattern 30 may correspond to how well the build materials have fused together. Thus, for instance, a quality level of the layer of build materials 32 may be determined from the determined condition of the deposited testing pattern 30.

Figure 1B:
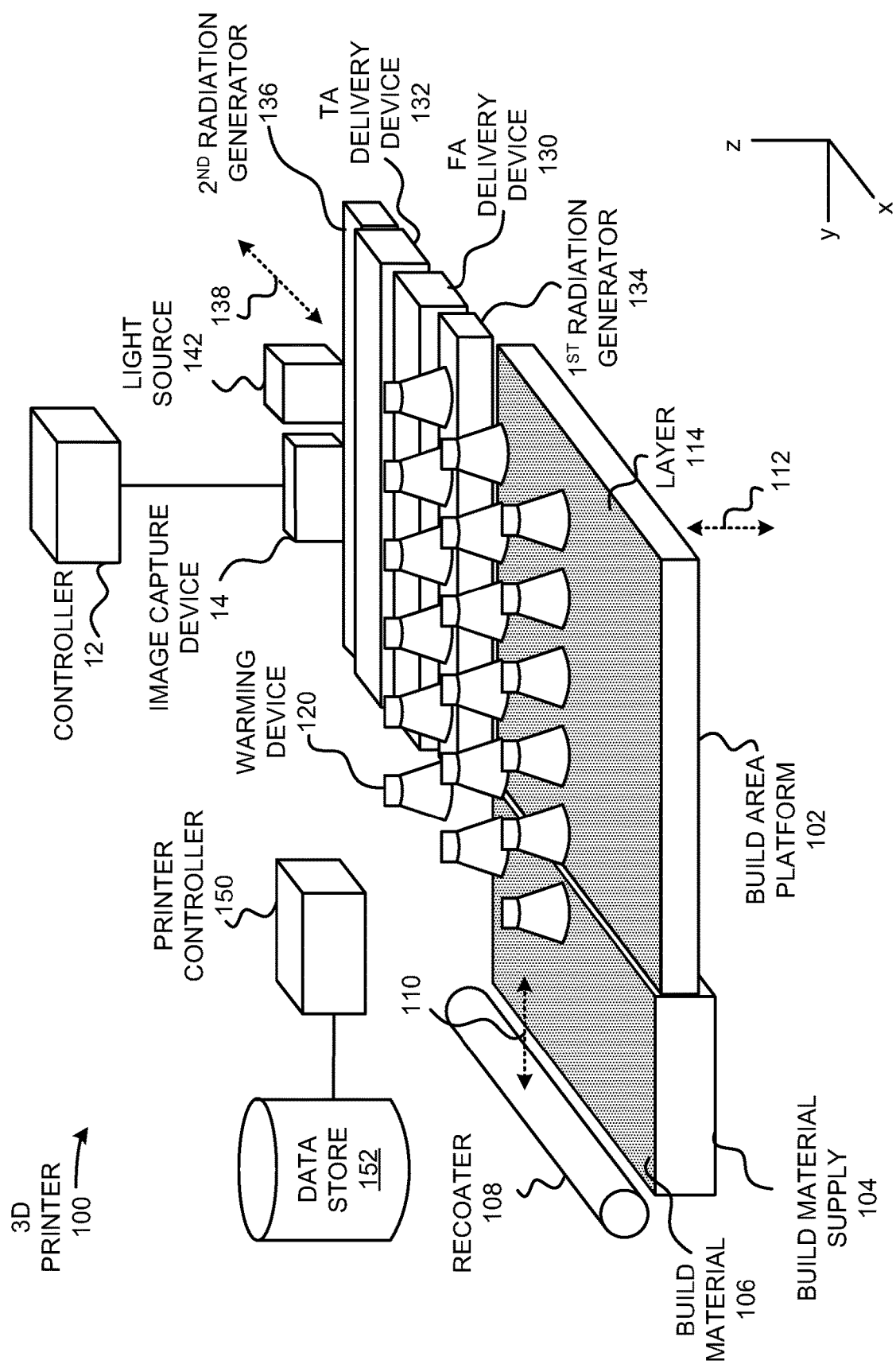
FIG. 1B shows a simplified isometric view of an example three-dimensional (3D) printer for generating, building, or printing three-dimensional parts.

Turning now to FIG. 1B, there is shown a simplified isometric view of an example three-dimensional (3D) printer 100 for generating, building, or printing three-dimensional parts. It should be understood that the 3D printer 100 depicted in FIG. 1B may include additional components and that some of the components described herein may be removed and/or modified without departing from a scope of the 3D printer 100 disclosed herein.

The 3D printer 100 is depicted as including a build area platform 102, a build material supply 104 containing build materials 106, and a recoater 108. The build material supply 104 may be a container or surface that is used to position build materials 106 between the recoater 108 and the build area platform 102. The build material supply 104 may be a hopper or a surface upon which the build materials 106 may be supplied, for instance, from a build material source (not shown) located above the build material supply 104. Additionally, or alternatively, the build material supply 104 may include a mechanism to provide, e.g., move, the build materials 106 from a storage location to a position to be spread onto the build area platform 102 or a previously formed layer of build materials 106. For instance, the build material supply 104 may include a hopper, an auger conveyer, or the like. Generally speaking, 3D objects or parts are to be generated from the build materials 106 and the build materials 106 may be formed of any suitable material including, but not limited to, polymers, metals, and ceramics. In addition, the build materials 106 may be in the form of a powder.

The recoater 108 may move in directions as denoted by the arrow 110, e.g., along the y-axis, over the build material supply 104 and across the build area platform 102 to spread a layer 114 of the build materials 106 over a surface of the build area platform 102. The layer 114 may be formed to a substantially uniform thickness across the build area platform 102. In an example, the thickness of the layer 114 may range from about 90 μm to about 110 μm, although thinner or thicker layers may also be used. For example, the thickness of the layer 114 may range from about 20 μm to about 200 μm, or from about 50 μm to about 200 μm. The recoater 108 may also be returned to a position adjacent the build material supply 104 following the spreading of the build materials 106. The recoater 108 may be a doctor blade, roller, a counter rotating roller or any other device suitable for spreading the build materials 106 over the build area platform 102.

The 3D printer 100 may include a plurality of warming devices 120 arranged in an array above the build area platform 102. Each of the warming devices 120 may be a lamp or other heat source that is used to apply heat onto spread layers of the build materials 106, for instance, to maintain the build materials 106 at or above a predetermined threshold temperature. According to an example, the warming devices 120 may maintain the temperatures of the build materials 106 at a relatively high temperature that facilitates the fusing of the build materials 106 at selected locations, e.g., the build materials 106 upon which a particular liquid, such as a fusing agent, has been mixed or applied. Although the warming devices 120 have been depicted as being in a fixed array, in other examples, the warming devices 120 may not be stationary, but instead, may be supported on a carriage (not shown).

The 3D printer 100 is further depicted as including a fusing agent (FA) delivery device 130 and a testing agent (TA) delivery device 132, which may both be scanned across the build area platform 102 in both of the directions indicated by the arrow 138, e.g., along the x-axis. The FA delivery device 130 and the TA delivery device 132 may be, for instance, thermal inkjet printheads, piezoelectric printheads, or the like, and may extend a width of the build area platform 102. Although the FA delivery device 130 and the TA delivery device 132 have each been depicted in FIG. 1B as being formed of a single device, it should be understood that each of the FA delivery device 130 and the TA delivery device 132 may include multiple printheads that span the width, e.g., along the y-axis, of the build area platform 102. The FA and the TA delivery devices 130, 132 may each include a printhead or multiple printheads available from the Hewlett Packard Company of Palo Alto, Calif.

In other examples in which the FA delivery device 130 and the TA delivery device 132 do not extend the width of the build area platform 102, the FA delivery device 130 and the TA delivery device 132 may also be scanned along the y-axis to thus enable the FA delivery device 130 and the TA delivery device 132 to be positioned over a majority of the area above the build area platform 102. The FA delivery device 130 and the TA delivery device 132 may thus be attached to a moving XY stage or a translational carriage (neither of which is shown) that is used to move the FA delivery device 130 and the TA delivery device 132 adjacent to the build area platform 102 in order to deposit respective liquid droplets in predetermined areas of a layer 114 of the build materials 106.

Although not shown, the FA delivery device 130 and the TA delivery device 132 may each include a plurality of nozzles through which a fusing agent and a testing agent may respectively be ejected onto the build material layer 114. According to an example, the fusing agent has a radiation absorbing property. In other words, the fusing agent may have a high ability to absorb radiation, which may be in the form of heat and/or light. Thus, for instance, the build materials 106 upon which the fusing agent is deposited may be heated more readily than the build materials 106 upon which the fusing agent has not been deposited. Various examples of the fusing agent are described in greater detail herein below.

According to an example, the testing agent may also have a radiation absorbing property. In these examples, the testing agent may have a lower or higher radiation absorbing property than the fusing agent. However, in other examples, the testing agent may not have a radiation absorbing property. In these examples, the testing agent may not affect or may insignificantly affect the heating of the build materials 106 upon which the testing agent has been deposited during application of radiation onto the testing agent and the build materials 106. In any regard, the testing agent may be any suitable liquid that may be distinguished from the fusing agent and the build material 106 in any of the visible, near infrared, ultraviolet, and infrared spectrums of light. That is, the testing agent may be any suitable liquid that may be discernable from the fusing agent and the build material 106 in captured images containing deposited regions of the testing agent.

According to an example, the testing agent has a color that differs from the fusing agent. In an example in which the fusing agent has a black color, the testing agent may have a visibly contrasting color, such as white, yellow, cyan, or the like. In this regard, the color of the testing agent may be matched with the color of the fusing agent such that testing agent is visibly discernable from the fusing agent. In other examples, the testing agent may not be visible in ambient light conditions. For instance, the testing agent may be fluorescent liquid that is visible under ultraviolet light conditions. As other examples, the testing agent may be a liquid containing quantom dots, a phosphorescent liquid, etc.

The fusing agent may be deposited onto the selected areas of the layer 114 of the build materials 106 that are to be fused together to form a section of a 3D printed part. In addition, the testing agent may be deposited in a testing pattern on one of the selected areas of the layer 114 at which the fusing agent has been deposited and in a pattern that is visually contrasting from the deposited fusing agent. The testing pattern may be a predetermined machine-readable pattern, such as a two-dimensional code that represents data, a barcode that represents data, an ornamental design, text, or the like. As discussed in greater detail herein, the image quality (e.g., readability) of the testing pattern following application of radiation may vary depending upon how well the build material 106 has fused together. For instance, if the build materials 106 have fused together well or as intended, the testing pattern may have a high image quality (e.g., is accurately readable) because the particles of the build material 106 on which the testing pattern has been deposited may form a relatively smooth surface. However, if the build material 106 has not fused together well, the testing pattern may have a low image quality (e.g., is not accurately readable) because there may be relatively large gaps between some of the particles of the build material 106 on which the testing pattern has been deposited. The testing pattern may also have other types of defects such as line distortions of various shapes, blurred lines, or the like.

Although not shown, the 3D printer 100 may include an additional delivery device that may deposit a liquid having a different radiation absorbing property from the fusing agent deposited from the FA delivery device 130. For instance, the additional delivery device may deposit a detailing agent that has a lower radiation absorbing proper than the fusing agent and may be used to better control fusing of the build material 106. By way of example, the detailing agent may be deposited near the borders of the areas of the build materials 106 at which the fusing agent is deposited to reduce thermal bleed at the borders.

Following deposition of the fusing agent from the FA delivery device 130 onto selected areas of the layer 114 of the build materials 106 and following deposition of the testing agent from the TA delivery device 132 onto a selected area of the layer 114, a first radiation generator 134 and/or a second radiation generator 136 may be implemented to apply radiation onto the layer of build materials 106. The first radiation generator 134 may also be implemented to apply radiation onto the build material 106 prior to deposition of the fusing agent and the testing agent, for instance, during a single pass, to pre-heat the build material 106 and reduce splashing that may be caused during deposition of the fusing agent and the testing agent.

The radiation may be in the form of light, electromagnetic radiation, microwaves, or the like. Particularly, for instance, the radiation generator(s) 134, 136 may be activated and moved across the layer 114 of build materials 106, for instance, along the directions indicated by the arrow 138, to apply radiation in the form of light and/or heat onto the build materials 106. Examples of the first and second radiation generators 134, 136 may include a UV, IR or near-IR curing lamp, IR or near-IR light emitting diodes (LED), halogen lamps emitting in the visible and near-IR range, microwaves, or lasers with desirable electromagnetic wavelengths. The types of radiation generators 134, 136 may depend, at least in part, on the type of active material used in the liquids applied onto the layer 114 of build materials 106.

As also shown in FIG. 1B, the controller 12 and the image capture device 14 of the apparatus 10 depicted in FIG. 1A may be provided in the 3D printer 100, for instance, as an add-on to the 3D printer 100. The 3D printer 100 may also include a light source 142, which the controller 12 may control to output light onto a testing pattern 30 and the image capture device 14 may be implemented to capture an image of the testing pattern 30 following application of the radiation. Thus, for instance, in an example in which the testing agent is a colored liquid, the light source 142 may output visible light to illuminate the deposited testing agent. However, in an example in which the testing agent is a fluorescent liquid, the light source 142 may output ultraviolet or black light. In an example, the FA delivery device 130, the TA delivery device 132, the first radiation generator 134, the second radiation generator 136, the image capture device 14, and the light source 142 may be supported on a carriage (not shown) that may be scanned over the build area platform 102 in the directions denoted by the arrow 138. In another example, the image capture device 14 and the light source 142 may be positioned separately from the carriage in a position above the build area platform 102.

Following fusing of the build materials 106 in the selected areas, the build area platform 102 may be lowered as denoted by the arrow 112, e.g., along the z-axis. In addition, the recoater 108 may be moved across the build area platform 102 to form a new layer of build materials 106 on top of the previously formed layer. Moreover, the FA delivery device 130 may deposit the fusing agent and the TA delivery device 132 may also deposit the testing agent onto respective selected areas of the new layer of build materials 106. The above-described process may be repeated until a predetermined number of layers has been formed to fabricate a desired 3D part.

The testing agent may be deposited on each layer 114 for which a quality level of the layer 114 is to be tested. Thus, for instance, the testing agent may be deposited on an intermediate layer 114 of a 3D printed part or the top or final layer 114 of the 3D printed part. By testing an intermediate layer 114 with the testing agent, a quality level determination may be made prior to completing printing of the 3D printed part. If the quality level is determined to be below a predefined threshold, an operator may be alerted of the potential issue and the operator may stop printing of the 3D printed part and may take measures to improve the quality of the 3D printed part may be taken. For instance, the operator may change the duration at which radiation is applied, may replace a defective 3D printer 100 component, etc.

As further shown in FIG. 1B, the 3D printer 100 may include a printer controller 150 that may control operations of the 3D printer 100 components including the build area platform 102, the build material supply 104, the recoater 108, the warming devices 120, the FA delivery device 130, the TA delivery device 132, and the radiation generators 134, 136. Particularly, for instance, the printer controller 150 may control actuators (not shown) to control various operations of the 3D printer 100 components. The printer controller 150 may be a computing device, a semiconductor-based microprocessor, a central processing unit (CPU), an application specific integrated circuit (ASIC), and/or other hardware device. Although not shown, the printer controller 150 may be connected to the 3D printer 100 components via communication lines.

The printer controller 150 is also depicted as being in communication with a data store 152. The data store 152 may include data pertaining to a 3D part to be printed by the 3D printer 100. For instance, the data may include the locations in each build material layer 114 that the FA delivery device 130 is to deposit the fusing agent. The data may also include the layer or layers 114 on which the TA delivery device 132 is to deposit a testing pattern. In one example, the printer controller 150 may use the data to control the locations on the build material layers 114 that the FA delivery device 130 and the TA delivery device 132 respectively deposit the fusing agent and the testing agent. According to an example, the printer controller 150 may also perform the functions of the controller 12, i.e., the printer controller 150 and the controller 12 may With reference now to FIG. 1C, there is shown a simplified block diagram of a few components of the example 3D printer 100 depicted in FIG. 1B as well as the controller 12 and the image capture device 14. Particularly, the printer controller 150, the FA delivery device 130, the TA delivery device 132, the controller 12, and the image capture device 14 are shown in FIG. 1C. A layer 160 of the build materials 106 is also depicted as being provided on a surface 162. The surface 162 may generally represent a previously spread layer of build materials 106 or the build area platform 102. As shown, the printer controller 150 may control the FA delivery device 130 to deposit droplets of a fusing agent 170 onto the build materials 106 in the build material layer 160. In addition, the printer controller 150 may control the TA delivery device 132 to deposit droplets of the testing agent 172 onto the build materials 106 in the build material layer 160. Moreover, the controller 12 may control the image capture device 14 to capture an image of a testing pattern deposited by the TA delivery device 132.

According to an example, the FA delivery device 130 may be scanned over the build material layer 160 and may be controlled to deposit the fusing agent 170 droplets onto selected areas of the layer 160. That is, the printer controller 150 may control the FA delivery device 130 to deposit the fusing agent 170 droplets onto the build materials 106 that are to be fused together. In addition, the TA delivery device 132 may be scanned over the build material layer 160 and may be controlled to deposit the testing agent 172 droplets onto selected areas of the layer 160, in which the selected areas overlap with some of the areas on which the fusing agent 170 droplets were deposited. That is, the testing agent 172 may be deposited to overlap with the fusing agent 170 on the build material layer 160.

In examples in which the FA delivery device 130 and the TA delivery device 132 are supported on a common platform or carriage, the FA delivery device 130 may be controlled to deposit the fusing agent 170 droplets during a first pass across the layer 160 and the TA delivery device 132 may be controlled to deposit the testing agent 172 droplets during a second pass across the layer 160. For instance, the FA delivery device 130 may deposit the fusing agent 170 droplets as the platform or carriage is scanned in a first direction across the layer 160 and the TA delivery device 132 may deposit the testing agent 172 droplets as the platform or carriage is scanned in a second direction across the layer 160. In other examples, however, the FA delivery device 130 and the TA delivery device 132 may be controlled to respectively deposit the fusing agent 170 droplets and the testing agent 172 droplets during a common pass across the layer 160. That is, the testing agent 172 may be deposited immediately following deposition of the fusing agent 170 during a single pass.

The fusing agent may include a heat- or radiation-absorbing agent (i.e., an active material). The active material may be any suitable material that absorbs heat and/or electromagnetic radiation. The active material may be selected to absorb heat and/or any wavelength in the electromagnetic spectrum. As examples, the electromagnetic radiation absorber may absorb IR radiation (i.e., a wavelength of about 700 nm to about 1 mm, which includes near-IR radiation (i.e., a wavelength of 700 nm to 1.4 μm)), ultra-violet radiation (i.e., a wavelength of about 10 nm to about 390 nm), visible radiation (i.e., a wavelength from about 390 nm to about 700 nm), microwave radiation (i.e., a wavelength of about 1 mm to 1 about m), radio radiation (i.e., a wavelength from about 1 m to about 1000 m), or a combination thereof. An example of the active material may be a microwave radiation-absorbing susceptor, such as carbon black, graphite, magnetite, and/or various iron oxides. Carbon black may also be used as an IR (including near-IR) radiation absorber. Examples of other suitable radiation absorbers include visible dyes, or IR dyes, or any suitable colorants having radiation absorption bands within the visible spectrum of electromagnetic radiation.

In another example, the fusing agent may include an active material or materials, such as metal nanoparticles. In one example, the metal nanoparticles are silver (Ag), copper (Cu), or zinc (Zn). Other examples of suitable metal nanoparticles include metal alloys (where the metals are selected from, for example, Ag, Au, Cu, Ni, Rh, Ru, Mo, Ta, Ti, Pt, or Pd), metal oxide (e.g., iron oxide), metal coated oxide (e.g., iron oxide coated with Ag, Au or Pt), cadmium selenide, and metal coated silica (e.g., silica coated with Ag or Au).

The fusing agent and/or the testing agent may also include a co-solvent, a surfactant, and/or a dispersant to assist in obtaining a particular wetting behavior with the build materials. In some instances, either or both of the fusing agent and the testing agent may include water or other primary solvent, either alone or with the active material. In other instances, either or both of the fusing agent and the testing agent may further include a dispersing additive, a surfactant, a co-solvent, a biocide, an anti-kogation agent, and combinations thereof.

It is to be understood that although two liquids have been described with respect to FIG. 1C, a greater number of liquids having different radiation absorbing properties with respect to each other may be selectively applied to the layer 160 of the 3D part. For instance, the 3D printer 100 may include additional delivery devices that are to deliver liquid having different properties than the FA and the TA delivery devices 130, 132. In one example, the 3D printer 100 may form 3D parts having a single color or having multiple colors. In addition, liquids having different colors may be deposited onto common ones of the build materials 106 to create mixed colored liquids, e.g., cyan and magenta may be mixed in various quantities to form a particular blue color. In addition, or alternatively, the choice of active materials to assist in the absorption of radiation, co-solvents, surfactants, dispersants, and anti-kogation agents may be deterministically optimized for specific applications and/or materials.

As another example, at least one of the liquids may be a cooling liquid that is to cool the build materials 106 with which the liquid has been mixed or upon which the liquid has been applied. For instance, the cooling liquid may be composed of any suitable liquid that may prevent the build materials 106 with which the liquid has been mixed or upon which the liquid has been deposited from fusing together during application of radiation onto those build materials 106 by either or both of the first and second radiation generators 134 and 136.

Figure 2A:
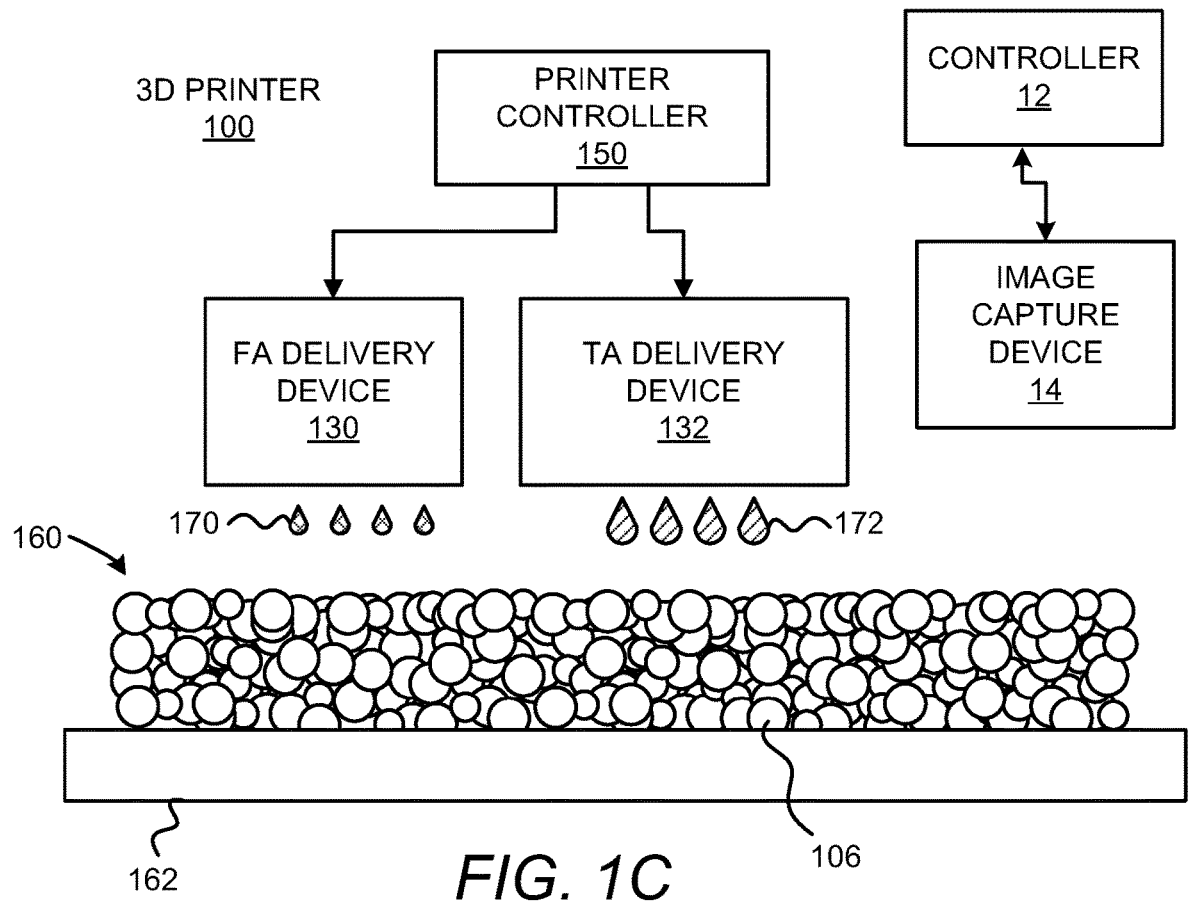
FIGS. 2A and 2B, respectively, show simplified top views of a layer on which an example testing pattern has been deposited.
Figure 2A:
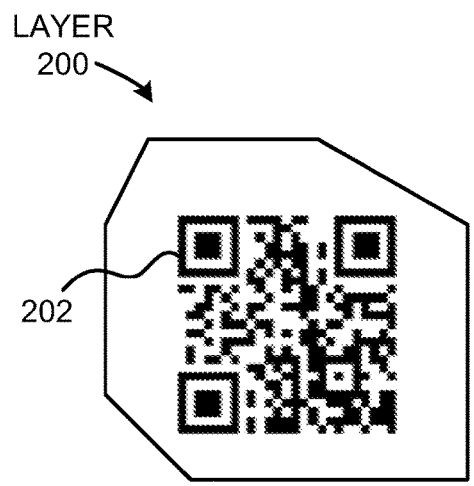
Figure 2B:
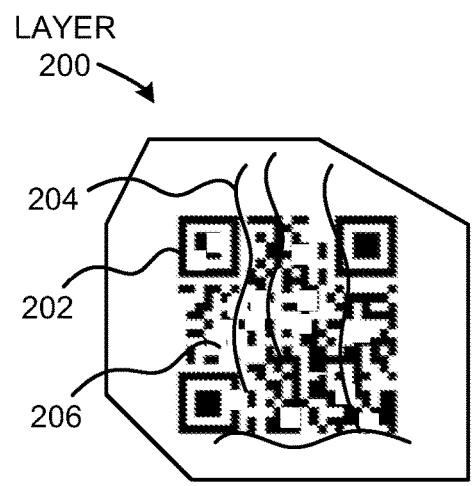

With reference now to FIGS. 2A and 2B, there are respectively shown simplified top views of a layer 200 on which an example testing pattern 202 has been deposited. The layer 200 may represent a first layer, an intermediate layer, or a final layer of a 3D printed part and may represent the layer following deposition of a fusing agent to form the shape of the layer 200, deposition of the testing agent in the testing pattern 202, and following emission of radiation onto the layer 200. In the example shown in FIG. 2A, the build materials 106 in the layer 200 are shown as having fused properly. That is, the build materials 106 may have melted and flowed as or nearly as intended such that the build materials 106 have fused without creating significant cracks or gaps in the fused build materials 106. As such, the testing pattern 202 in FIG. 2A may have a high quality, e.g., may be accurately read. That is, a controller 12 may be able to accurately read the testing pattern 202, which is depicted as a two-dimensional code such as a quick response (QR) code, and determine the data represented by the two-dimensional code.

In contrast, the layer 200 depicted in FIG. 2B is depicted as not having fused properly. That is, the layer 200 is depicted as including defects 204 in the form of cracks or gaps between the build materials 106. That is, the build materials 106 may not have melted and flowed as intended, for instance, due to a defect in the heating process, an error in the distance between the FA delivery device 130 and the layer 200, an error in the height of the build area platform 102, etc. As a result of the defects 204, the image quality of the testing pattern 202 may be reduced. For instance, the testing pattern 202 may have defects 206, such as missing sections of the testing pattern 202, a deformed pattern, a warped pattern, a blurred pattern, etc. As a result, the controller 12 may not be able to accurately determine the data that the testing pattern 206 represents. The controller 12 may thus determine that the layer 200 shown in FIG. 2B may be defective and may thus alert an operator that there may be a problem with the printing operation, which may include the 3D printed part quality, the printing process quality, the printer hardware quality.

Figure 3:
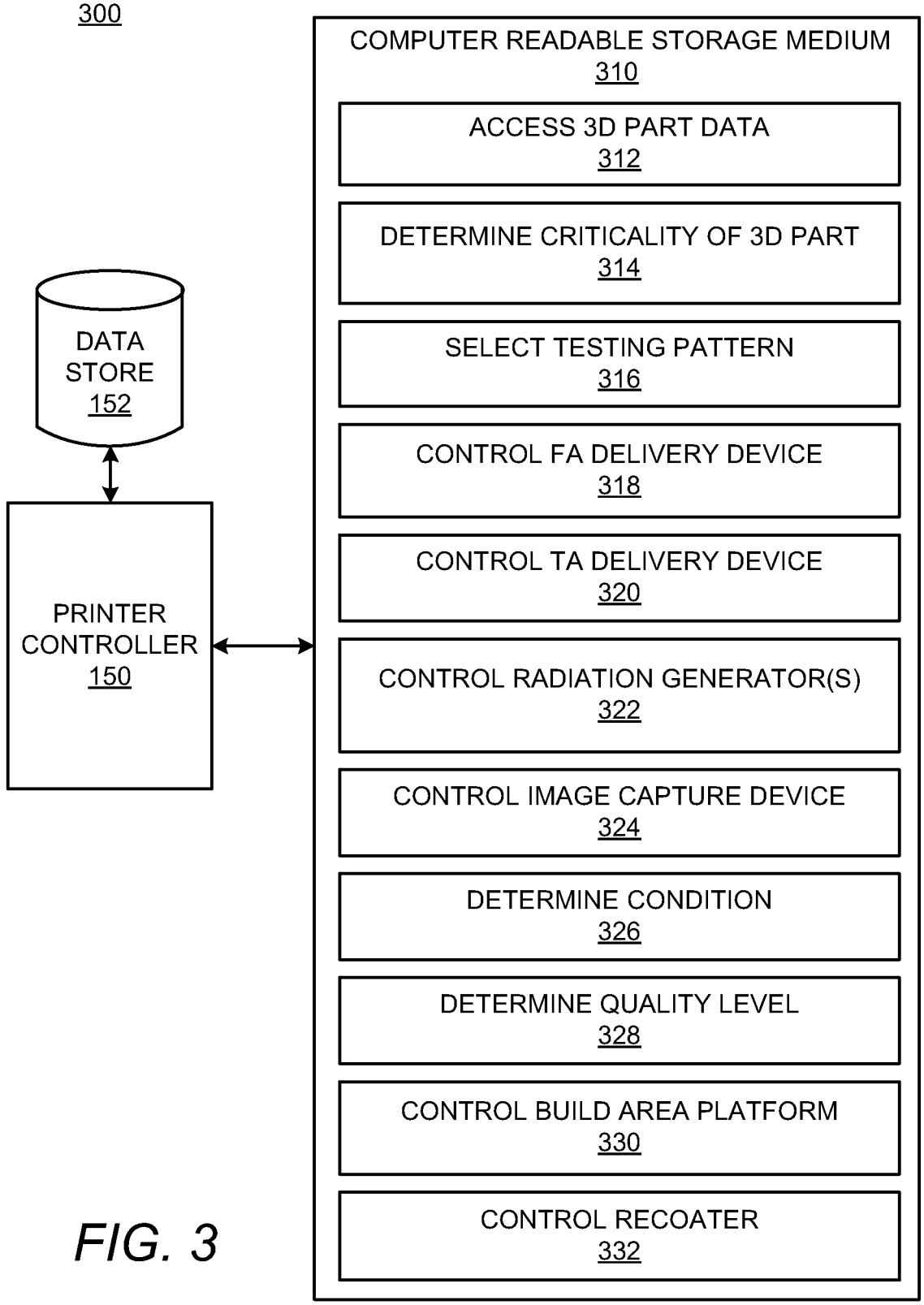
FIG. 3 depicts a block diagram of an example apparatus that may be implemented in the 3D printer depicted in FIG. 1B.

Turning now to FIG. 3, there is shown a simplified block diagram of an example apparatus 300 that may be implemented in the 3D printer depicted in FIG. 1B. In one example, the apparatus 300 may form part of the 3D printer 100 depicted in FIG. 1B. For instance, the apparatus 300 may be a command module or other control system of the 3D printer 100. It should be understood that the apparatus 300 depicted in FIG. 3 may include additional components, and that some of the components described herein may be removed and/or modified without departing from a scope of the apparatus 300 disclosed herein.

The apparatus 300 depicted in FIG. 3 is shown as including a printer controller 150 and a data store 152, which may be the same as the printer controller 150 and data store 152 depicted in and described above with respect to FIG. 1B. As such, the printer controller 150 and the data store 152 depicted in FIG. 3 are not described in detail and instead, the descriptions of the printer controller 150 and the data store 152 provided above with respect to the 3D printer 100 are intended to also describe these components with respect to the apparatus 300. The printer controller 150 depicted in FIG. 3 may include the features of the controller 12, i.e., the printer controller 150 may implement the functions discussed herein with respect to the controller 12.

As shown in FIG. 3, the apparatus 300 may include a computer readable storage medium 310 on which is stored machine readable instructions 312-332 (which may also be termed computer readable instructions) that the printer controller 150 may execute. More particularly, the printer controller 150 may fetch, decode, and execute the instructions 312-332 to access data pertaining to a 3D part to be printed 312, determine a criticality of the 3D part 314, selected a testing pattern 316, control a FA delivery device to deliver a fusing agent 318, control a TA delivery device to deliver a testing agent into a testing pattern 320, control a radiation generator(s) to apply radiation 322, control an image capture device to capture an image of the delivered testing pattern 324, determine a condition of the delivered testing pattern 324, determine a quality level of the layer of build materials 328, control a build area platform 330, and control a recoater 332. As another example or in addition to retrieving and executing instructions, the printer controller 150 may include one or more electronic circuits that include components for performing the functionalities of the instructions 312-332. In any regard, and as discussed above, the printer controller 150 may communicate instruction signals to the various components of the 3D printer 100 via communication lines such that the components may operate in the manners described herein.

The computer readable storage medium 310 may be any electronic, magnetic, optical, or other physical storage device that contains or stores executable instructions. Thus, the computer readable storage medium 310 may be, for example, Random Access Memory (RAM), an Electrically Erasable Programmable Read-Only Memory (EEPROM), a storage device, an optical disc, and the like. The computer readable storage medium 310 may be a non-transitory machine-readable storage medium, where the term "non-transitory" does not encompass transitory propagating signals.

Figure 4:
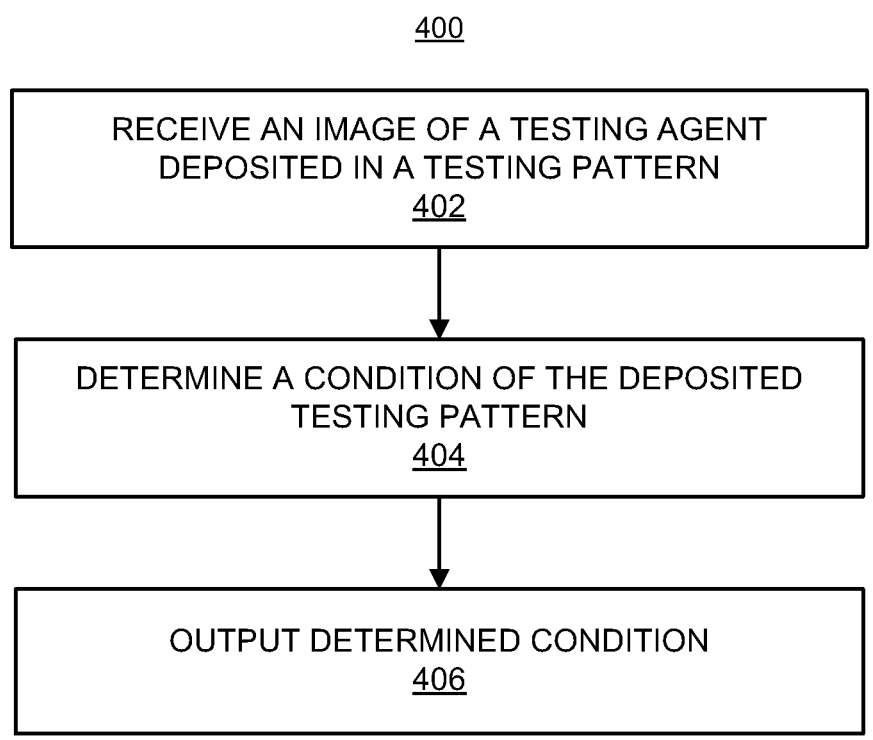
FIGS. 4 and 5, respectively, depict example methods for determining a quality level of a layer of build materials.
Figure 5:
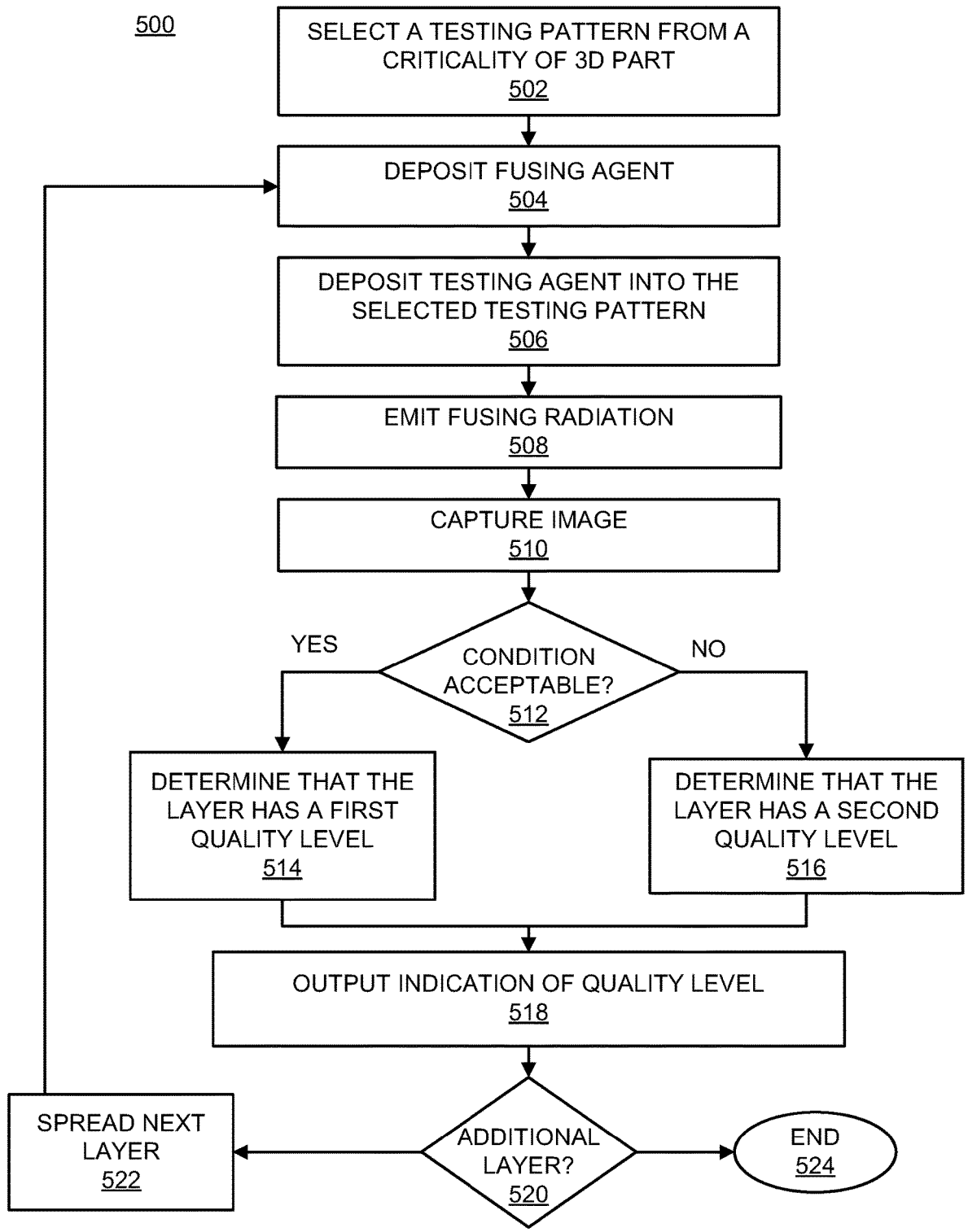

Various manners in which the apparatus 300 may be implemented are discussed in greater detail with respect to the methods 400 and 500 respectively depicted in FIGS. 4 and 5. Particularly, FIGS. 4 and 5, respectively, depict example methods 400 and 500 for determining a quality level of a layer of build materials. The quality level of the layer of build materials may also be used to determine a quality level of a 3D printed part formed using the layer of build materials. It should be apparent to those of ordinary skill in the art that the methods 400 and 500 may represent generalized illustrations and that other operations may be added or existing operations may be removed, modified, or rearranged without departing from the scopes of the methods 400 and 500.

The descriptions of the methods 400 and 500 are made with reference to the apparatus 10 illustrated in FIG. 1A, the 3D printer 100 illustrated in FIG. 1B, and the apparatus 300 illustrated in FIG. 3 for purposes of illustration. It should, however, be understood that 3D printers and apparatuses having other configurations may be implemented to perform either or both of the methods 400 and 500 without departing from the scopes of the methods 400 and 500. In the methods 400 and 500, it should be understood that the deposition of the fusing agents and the testing agent as well as the determination of the quality level of the layer may be performed for a first layer, an intermediate layer, or a final layer of a 3D part.

With reference first to FIG. 4, at block 402, an image of a testing agent deposited in a testing pattern 30 onto the layer of build materials 32 may be received, in which the layer of build materials 32 forms a section of a three-dimensional printed part. For instance, the controller 12 may execute the instructions 22 to receive the image of the testing pattern 30 captured by the image capture device 14. As discussed herein, the testing agent may be deposited in the testing pattern 30 on top of a deposited fusing agent 34 and the image capture device 14 may capture the image of the deposited testing pattern 30 following application of radiation to fuse the build materials on which the fusing agent 34 has been deposited.

At block 404, a condition of the deposited testing pattern 30 in the captured image may be determined. For instance, the controller 12 may execute the instructions 24 to determine the condition of the deposited testing pattern 30. As discussed herein, the controller 12 may determine the condition of the deposited testing pattern 30 based upon whether the controller 12 is able to accurately read the deposited testing pattern 30. Thus, for instance, the controller 12 may determine that the deposited testing pattern 30 has a first condition in response to a determination that the controller 12 is able to accurately read the deposited testing pattern 30. In addition, the controller 12 may determine that the deposited testing pattern 30 has a second condition in response to a determination that the controller 12 is unable to accurately read the deposited testing pattern 30. The first condition may be an acceptable condition and the second condition may be an unacceptable condition.

At block 406, the determined condition of the deposited testing pattern 30 may be outputted. In addition, the quality level of the layer of build materials 32 may be determined from the determined condition. Thus, for instance, the controller 12 may output the determined condition via a display or other device and an operator may determine the quality level of the layer of build materials 32 from the determined condition.

Reference is now made to the method 500 depicted in FIG. 5. Prior to execution of the method 500 or as part of the method 500, the printer controller 150 may execute the instructions 312 stored on the machine-readable medium 310 to access data pertaining to a 3D part that is to be printed. By way of example, the printer controller 150 may access data stored in the data store 152 pertaining to a 3D part that is to be printed. The printer controller 150 may determine the number of layers of build materials 106 that are to be formed and the locations at which fusing agent is to be deposited in each of the layers to form the 3D part. The printer controller 150 may also determine on which of the layers testing agent is to be deposited.

At block 502, a testing pattern may be selected from a criticality of a 3D part to be printed. For instance, the printer controller 150 may execute the instructions 314 to determine the criticality of the 3D part that is to be printed. The criticality of the 3D part may depend upon the intended usage of the 3D part. For instance, a 3D part that is required to meet relatively strict structural characteristics, such as a final part to be used in an end product, may have a relatively higher criticality than may a 3D part that is a prototype of a final part to be used in the end product. In any regard, a user may supply the criticality of the 3D part to the apparatus 300. In addition, correlations between various criticalities and various testing patterns may have previously been determined and stored in the data store 152. That is, for instance, the correlations may indicate that more complex testing patterns may correspond to more critical 3D parts. In addition or as another example, the locations of specific critical points of a 3D printed part containing the layer 114 of build materials 106 may have been previously identified and a testing pattern or multiple testing patterns may be deposited onto the layer 114 corresponding to those specific critical points.

In addition, the printer controller 150 may execute the instructions 316 to select a testing pattern corresponding to the determined criticality of the 3D part. The printer controller 150 may select the testing pattern based upon the correlations between the criticalities and the testing patterns stored in the data store 152. The printer controller 150 may also identify the location or locations at which the selected testing pattern is to be deposited, for instance, based upon a determination to test a section of the layer 114 determined to be critical.

At block 504, fusing agent may be deposited in areas of a layer 114 of build materials 106 that are to be fused together. For instance, the printer controller 150 may execute the instructions 318 to control the FA delivery device 130 to deposit fusing agent onto the areas of the layer 114 of build materials 106. Prior to deposition of the fusing agent, the printer controller 150 may execute the instructions 322 to control a first radiation generator 134 to preheat the build materials 106 in the layer 114 to reduce splashing caused during deposition of the fusing agent.

At block 506, testing agent may be deposited into the selected testing pattern onto an area on which the fusing agent has been deposited. As discussed herein, the testing agent may be a fluid that is visible under ambient lighting conditions or may be invisible under ambient lighting conditions, but may be visible under UV or IR lighting conditions. As also discussed herein, the testing pattern may be a machine-readable pattern. In this regard, the testing pattern may be a two-dimensional code (such as a QR code), a bar code, an ornamental design, text, or the like. The testing pattern may also be construed as a predetermined arrangement, a predetermined pattern, or the like. The printer controller 150 may execute the instructions 320 to control the TA delivery device 132 to deposit testing agent onto a selected area of the layer 114 on which the fusing agent has been deposited. For instance, the printer controller 150 may control the FA delivery device 130 to deposit fusing agent during a first scan of a carriage supporting the FA delivery device 130 and may control the TA delivery device 132 to deposit testing agent during a second scan of the carriage supporting the TA delivery device 132. In another example, the printer controller 150 may control the FA delivery device 130 and the TA delivery device 132 to respectively deposit fusing agent and testing agent during a common scan. That is, the testing agent may be deposited immediately following deposition of the fusing agent.

In addition, the printer controller 150 may deposit the testing pattern in a selected area of the layer 114 of build materials 106, for instance, in an area at which the part quality of the layer 114 is to be tested. The area may be a critical portion of a 3D printed part formed from the layer 114. Multiple testing patterns may also be placed in multiple areas of the layer 114.

At block 508, radiation may be emitted onto the build materials 106 to cause the build materials 106 upon which the fusing agent has been deposited to fused together. For instance, the controller 150 may execute the instructions 322 to control a radiation generator 134 or multiple radiation generators 134, 136 to emit radiation to fuse the build materials 106 together. The radiation generator(s) 134, 136 may be controlled to emit the radiation as the radiation generator(s) 134, 136 is scanned across the layer 114 of build materials 106.

At block 510, an image of the deposited testing pattern may be captured. For instance, the printer controller 150 may execute the instructions 324 to control the image capture device 14 to capture an image of the deposited testing pattern. The printer controller 150 may also control the light source 142 to illuminate the deposited testing pattern.

At block 512, the printer controller 150 may determine whether a determined condition of the deposited testing pattern is acceptable. For instance, the printer controller 150 may determine the condition of the deposited testing pattern from the captured image of the deposited testing pattern as discussed above. The printer controller 150 may also execute the instructions 326 to determine whether the determined condition meets a threshold condition. For instance, the printer controller 150 may determine whether the image quality of the testing pattern meets the threshold condition, e.g., is accurately readable. By way of particular example in which the testing pattern is a two-dimensional code that represents data, the printer controller 150 may determine that the condition of the deposited testing pattern is relatively high in response to the printer controller 150 being able to read the data corresponding to the two-dimensional code and determining that the read data is accurate. However, if the printer controller 150 is unable to accurately read the data corresponding to the two-dimensional code, the printer controller 150 may determine that the condition of the deposited testing pattern is relatively low. In another particular example in which the testing pattern is an ornamental design, the printer controller 150 may compare the ornamental design in the captured image with a previously stored version of the ornamental design and may determine that the condition of the testing pattern is relatively good in response to the ornamental design in the captured image being identical or nearly identical to the previously stored version of the ornamental design.

In response to a determination that the condition of the deposited testing pattern is acceptable at block 512, the printer controller 150 may determine that the layer 114 as a first quality level as indicated at block 514. However, in response to a determination that the condition of the deposited testing pattern is not acceptable at block 512, the printer controller 150 may determine that the layer 114 as a second quality level as indicated at block 516. The first quality level may be relatively higher than the second quality level. Although only two quality levels have been described, it should be understood that the controller 150 may determine that the layer 114 has any of a number of different quality levels based upon multiple possible conditions of the deposited testing pattern without departing from a scope of the method 500. For instance, the printer controller 150 may determine whether the testing pattern has any of a plurality of conditions depending upon the level of defects contained in the captured image of the testing pattern. The plurality of conditions may be ranked according to the severities of the issues, e.g., readability, defects, etc., in the captured image of the testing pattern. Correlations between the plurality of conditions and corresponding quality levels of the layer 114 of build materials 106 may have previously been determined and stored in the data store 152. The printer controller 150 may determine the quality level of the layer 114 of build materials 106 by accessing the data store 152 and identifying the quality level corresponding to the determined condition of the deposited testing pattern.

At block 518, an indication of the determined quality level may be outputted. For instance, the printer controller 150 may execute the instructions 328 to output an indication that the layer 114 was determined to have one of the first quality level and the second quality level. By way of particular example, in response to a determination that the layer 114 has the second quality level, the printer controller 150 may output an indication to provide an alert that there may be a defect or an issue with the layer 114.

At block 520, the printer controller 150 may determine whether an additional layer is to be formed, for instance, based upon accessed information regarding the 3D part to be printed. In response to a determination that an additional layer is to be formed, a next layer of build materials 106 may be spread on top of the previous layer, as indicated at block 522. For instance, the controller 150 may execute the instructions 330 to control the build area platform 102 to be moved downward and may execute the instructions 332 to control the recoater 108 to spread build materials 106 across the previous layer. In addition, blocks 502-522 may be repeated until no additional layers are to be formed, at which point the method 500 may end, as indicated at block 524. In various instances, block 506 may be omitted during some or all of the remaining iterations of blocks 502-522, for instance, as the quality levels of each of the additional layers may not be determined.

Although particular reference is made herein to the printer controller 150 performing various operations in the method 500, it should be understood that some of these operations may instead be performed by the controller 12. For instance, the printer controller 150 may perform the operations directed to the 3D printer 100 and the controller 12 may perform the operations directed to the determination of whether a condition of a testing pattern is acceptable.

Some or all of the operations set forth in the methods 400 and 500 may be contained as programs or subprograms in any desired computer accessible medium. In addition, the methods 400 and 500 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
    an image capture device; and
    a controller;
    a computer readable storage medium on which is stored instructions that are to cause the controller to:
        receive, from the image capture device, an image of a testing agent deposited in a testing pattern onto a fusing agent that has been deposited onto a layer of build materials, wherein the layer of build materials is to form a section of a three-dimensional printed part, wherein the fusing agent has a radiation absorbing property, wherein the build materials on which the fusing agent and the testing agent have been deposited have undergone a fusing operation, and wherein the received image is an image of the deposited testing pattern following the fusing operation; and
        determine a condition of the deposited testing pattern in the received image, wherein the determined condition is to be used to determine a quality level of the layer of build materials.

2. The apparatus according to claim 1, wherein the testing pattern comprises a machine-readable pattern.

3. The apparatus according to claim 1, wherein the testing pattern comprises a two-dimensional code representing data.

4. The apparatus according to claim 1, wherein the condition of the deposited testing pattern comprises a readability of the deposited testing pattern and wherein the quality level of the layer of build materials is to be determined based upon the readability of the deposited testing pattern.

5. The apparatus according to claim 1, wherein the testing agent comprises at least one of a fluorescent liquid, a colored liquid, a liquid containing quantum dots, and a phosphorescent liquid.

6. The apparatus according to claim 1, wherein the layer of build materials comprises one of an intermediate layer and a final layer in a printed part containing the layer of build materials.

7. A method for determining a quality level of a layer of build materials, said method comprising:
    depositing a fusing agent in areas of the layer of build materials that are to be fused together;
    depositing a testing agent in a testing pattern onto an area of the layer of build materials;
    applying radiation to fuse the build materials in the areas of the layer of build materials on which the fusing agent and the testing agent have been deposited;
    receiving an image of the testing agent deposited in the testing pattern onto the layer of build materials, wherein the layer of build materials forms a section of a three-dimensional printed part, wherein the received image of the deposited testing agent is captured following application of the radiation;
    determining a condition of the deposited testing pattern in the captured image; and
    outputting the determined condition of the deposited testing pattern, wherein the quality level of the layer of build materials is to be determined from the determined condition.

8. The method according to claim 7, further comprising:
    determining a criticality of the three-dimensional printed part; and
    selecting the testing pattern from a plurality of testing patterns based upon the determined criticality of the printed part.

9. The method according to claim 7, wherein depositing the testing agent further comprises depositing the testing agent onto one of the areas on which the fusing agent has been deposited.

10. The method according to claim 7, wherein the testing pattern is a two-dimensional code that represents data, wherein determining a condition of the deposited testing pattern further comprises determining whether the controller is able to accurately read the two-dimensional code, and wherein the controller is to determine that the deposited testing pattern has a first condition in response to the controller being able to accurately read the two-dimensional code and to determine that the deposited testing pattern has a second condition in response to the controller not being able to accurately read the two-dimensional code.

11. A non-transitory computer readable medium on which is stored machine readable instructions that when executed by a processor, cause the processor to:
    receive an image of a testing agent deposited in a predetermined arrangement onto a fusing agent that has been deposited onto layer of build materials, wherein the layer of build materials is to form a section of a three-dimensional printed part, wherein the fusing agent has a radiation absorbing property, and wherein the build materials on which the fusing agent and the testing agent have been deposited have undergone a fusing operation;
    determine a condition of the deposited predetermined arrangement from the received image; and
    output the determined condition of the deposited predetermined arrangement, wherein a quality level of the layer of build materials is to be determined from the determined condition.

12. The non-transitory computer readable medium according to claim 11, wherein the instructions are further to cause the processor to:
receive the image of the testing agent deposited in the predetermined arrangement onto the fusing agent that has been deposited onto the layer of build materials following application of radiation to fuse the build materials on which the fusing agent has been deposited.

13. The non-transitory computer readable medium according to claim 11, wherein the predetermined arrangement is a two-dimensional code that represents data, and wherein to determine the condition of the deposited predetermined arrangement, the instructions are further to cause the processor to:
determine whether the two-dimensional code is accurately readable by a controller;
determine that the predetermined arrangement has a first condition in response to the controller being able to accurately read the two-dimensional code; and
determine that the deposited predetermined arrangement has a second condition in response to the controller not being able to accurately read the two-dimensional code.

* * * * *